Dec. 19, 1961
R. E. BOYDEN
3,013,430
SPRING TESTING DEVICE
Filed Nov. 17, 1959
3 Sheets-Sheet 2
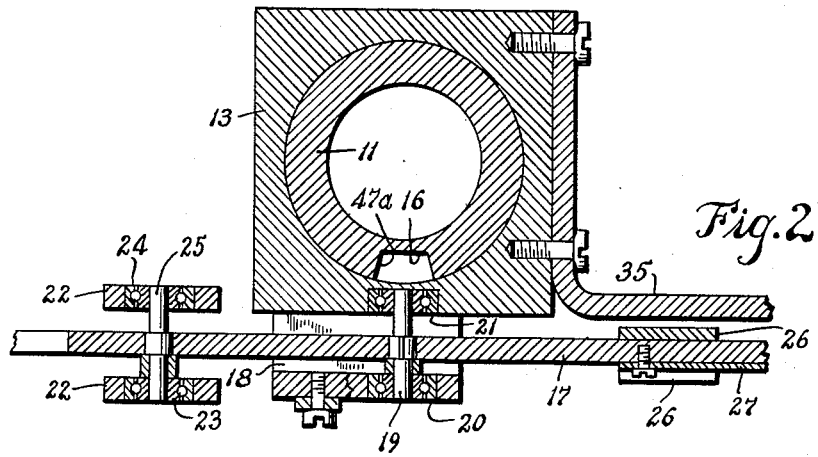
Fig.2
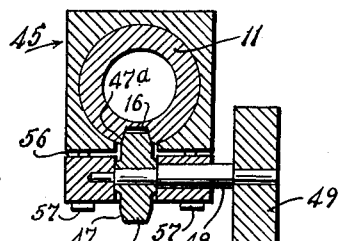
Fig.4
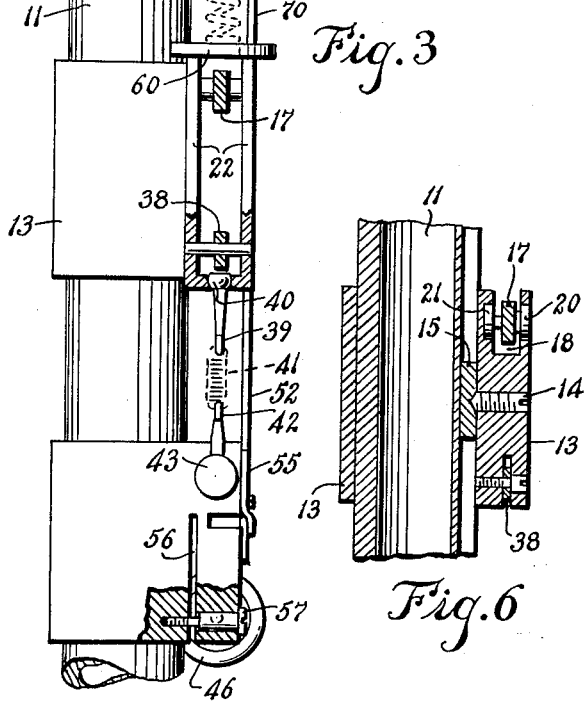
Fig.3
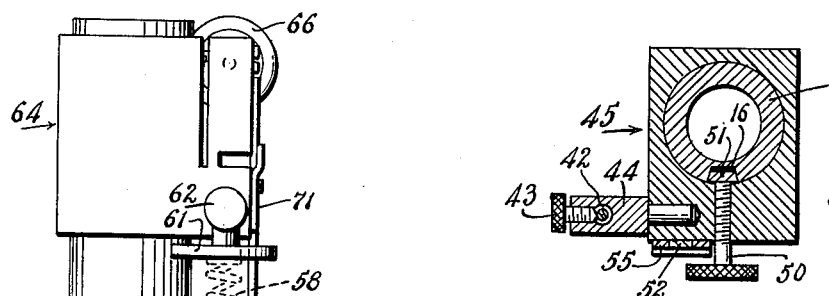
Fig.6
Fig.5
INVENTOR,
Robert E. Boyden
BY
Fred N. Schwend
ATTORNEY.

Dec. 19, 1961

R. E. BOYDEN 3,013,430

SPRING TESTING DEVICE

Filed Nov. 17, 1959

INVENTOR,
Robert E. Boyden
BY
ATTORNEY.

United States Patent Office 3,013,430
Patented Dec. 19, 1961

3,013,430
SPRING TESTING DEVICE
Robert E. Boyden, 5608 N. Sultana Ave.,
Temple City, Calif.
Filed Nov. 17, 1959, Ser. No. 853,512
6 Claims. (Cl. 73—161)

This invention relates to equipment for measuring the force and displacement of tension and compression springs.

Force and displacement characteristics of springs are of critical importance in certain applications and it is therefore desirable to provide a simple and yet effective device for accurately and readily measuring such characteristics of both tension and compression springs.

Springs of the above type are often produced as highly accurate elements and in large quantities. It is therefore desirable to provide a spring tesiting device which will rapidly and accurately indicate whether or not the force of a spring being tested under a predetermined deflection is within a prescribed tolerance.

A further object is to provide a spring testing device which is readily adjustable for different types and sizes of springs.

Another object is to provide an economical and yet accurate spring tester which is highly resistant to wear.

The manner in which the above and other objects of the invention are accomplished will be readily understood on reference to the following specification when read in conjunction with the accompany drawings, wherein:

FIG. 2 is a sectional plan view taken along line 2—2 of FIG. 1.

FIG. 3 is a sectional elevation view taken along line 3—3 of FIG. 1.

FIG. 4 is a sectional plan view taken along line 4—4 of FIG. 1.

FIG. 5 is a sectional plan view taken along line 5—5 of FIG. 1.

FIG. 6 is a sectional view taken along line 6—6 of FIG. 1.

FIG. 7 is an enlarged fragmentary view of the counterbalance weight support link and its pivotal support.

Figure 1:
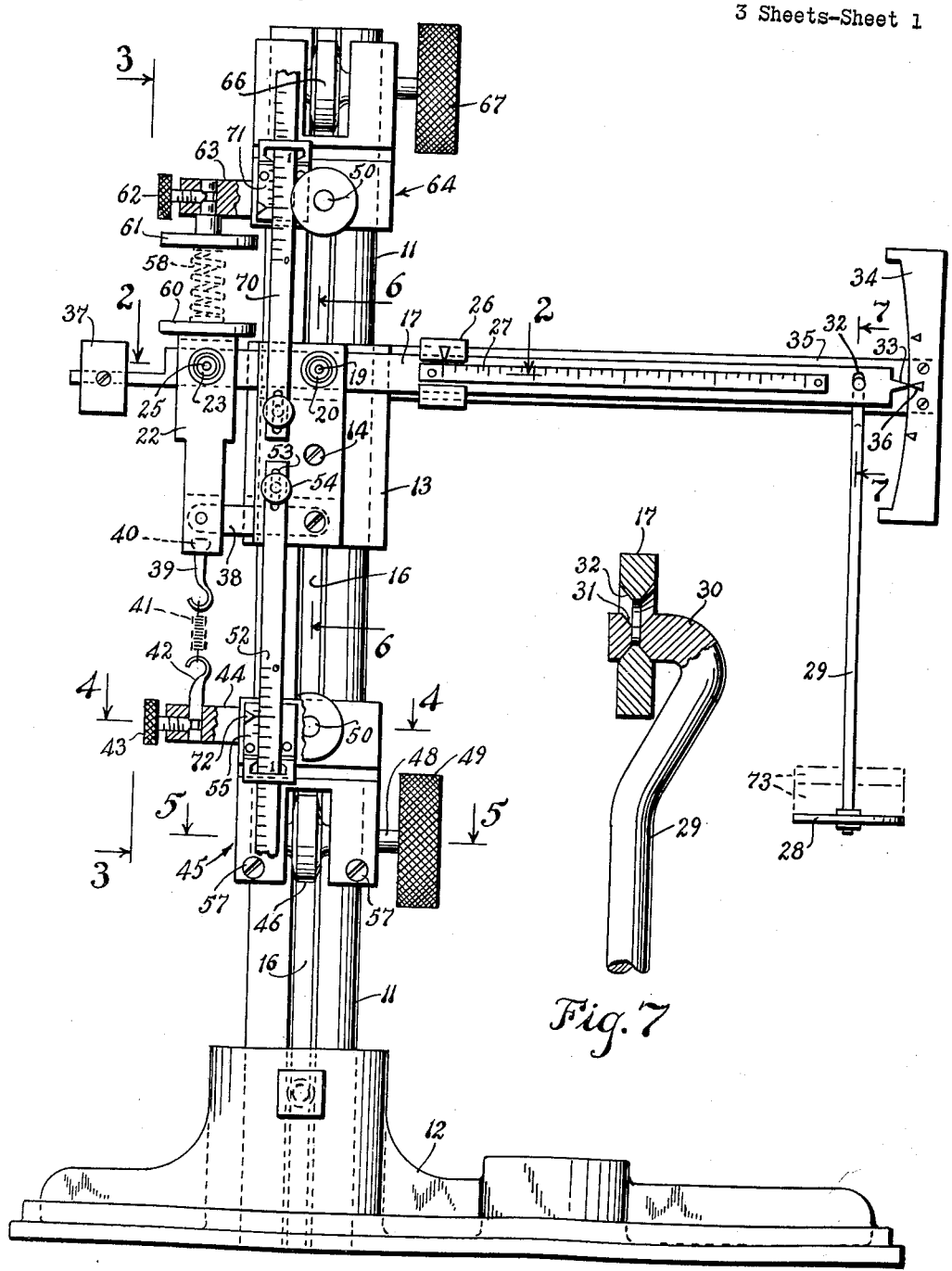
FIG. 1 is a front view of a spring tester embodying a preferred form of the present invention.

Referring first to FIGS. 1 to 7, the spring tester comprises a vertical standard 11 supported by a base 12. A hollow beam support block or bracket 13 is slideably mounted on the standard and is adjustably locked in different positions therealong by a set screw 14 which presses against a key element 15 (FIG. 6) slideably mounted in a longitudinally extending groove 16 (see also FIG. 2) formed in the standard.

A balance beam 17 is located in a slot 18 in the block 13 and is secured on a shaft 19 rotatably supported by ball bearings 20 and 21 mounted in the block on opposite sides of the slot 18.

A vertically extending box shaped link 22 is provided, in opposite legs thereof, with ball bearings 23 and 24, which rotatably support a second shaft 25 extending through the beam and attached thereto. The beam 17 has a slider weight 26 slideable therealong relative to a scale 27 attached to the beam and graduated in fractions of pounds. To further load the scale a weight table 28 is provided, being suspended on a rod 29 (see also FIG. 7) which is bent at 30 and formed with a groove 31 pivotally fitted in an enlarged opening 32 formed in the beam.

The beam 17 terminates in an index point 33 movable along a scale plate 34 attached to an arm 35 rigidly attached to the block 13. Suitable marks as at 36 may be inscribed on the plate 34 to indicate different degrees of deflection of the beam.

An additional counterweight 37 is secured to the beam 17 to counter-balance the same in its neutral position under no-load conditions.

The link 22 is maintained in a vertical position in all deflected positions of the beam 17 by a link 38 pivoted at one end to the link and at the other end to the block.

A spring supporting hook 39 is provided, having a semispherical head 40 rockably fitted in a mating seat formed in the lower end of the link 22. The latter is arranged to support one end of a tension spring (shown in dotted lines 41) to be measured. The other end of the spring 41 is arranged to be connected to a second hook 42 attached by a set screw 43 to a block 44 attahced to a carriage, generally indicated at 45, slideable along the standard 11.

The carriage 45 is adjustable along the standard by a friction wheel 46 (see also FIG. 5) of plastic or the like having tapered sides 47 which engage the similarly tapered sides of the groove 16. The wheel 46 is secured on a shaft 48 journalled in bearings formed in the carriage, an adjusting knob 49 being attached to the shaft to enable manual rotation of the wheel to traverse the carriage along the standard. It will be noted that the wheel 46 engages only the tapered sides 47a of the groove. A set screw 50, threaded in the carriage, engages a key 51 slideable along the groove 16 to lock the carriage in any adjusted position, if desired.

In order to measure the free length of the spring 41, as well as any extension thereof, a scale 52, calibrated preferably in inches or other units of length, is provided. The scale is provided with an elongated slot 53 embracing the shank of a clamp screw 54 threaded in the block 13. The scale moves past a vernier scale 55 formed on the carriage 45 to indicate the adjustment of the carriage.

In order to obtain the proper frictional engagement of the wheel 46 in the groove 16, the portion of the carriage 45 carrying the wheel is slit at 56 (see also FIG. 3) and screws 57 are threaded into the carriage through such portion to spring the same sufficiently to adjust the degree of engagement of the wheel.

In order to measure compression springs, as indicated by the dotted lines 58, a table 60 is formed on the link 22 opposite a second table 61 removably attached by clamp screw 62 to a block 63 carried by a second carriage 64. The carriage 64 is similar to carriage 45, having a wheel 66, of the same shape as wheel 46, and movable along the groove 16 by a knob 67.

A scale 70 is attached to the block 13 in the same manner as is scale 52 and is movable relative to a vernier scale 71 to indicate the adjustment of carriage 64 aiong the standard.

Any desired mode of manipulation of the device may be practiced, as will be readily apparent to one skilled in the art. For example, in initially setting the device to measure a tension spring, i.e. spring 41, the carriage 45 is first adjusted until the hooks 39 and 42 touch each other. The clamp screw 54 is then loosened and the scale 52 moved lengthwise until the 0 indication on the scale is opposite the index point 72. The screw 54 is then tightened and the carriage moved downward to enable the spring to be attached between the hooks 39 and 42. In order to measure, for example, the deflection of the spring under different tensile loads, the carriage is first adjusted to the free length of the spring. Then, calibrated weights 73 may be placed on the weight table 28 and the slider weight 26 may be adjusted to any desired fractional weight. The beam will now deflect and the carriage will be adjusted to return the beam to its illustrative neutral position. The movement of the carriage, indicative of the deflection of the spring can be obtained by reference to the scale 52.

Measurement of the characteristics of a compression spring, i.e. 58, may be obtained in a similar manner by adjusting the carriage 64.

If unusually long tension or compression springs are to be measured the block 13 may be adjusted along the standard to accommodate such springs.

Figure 8:
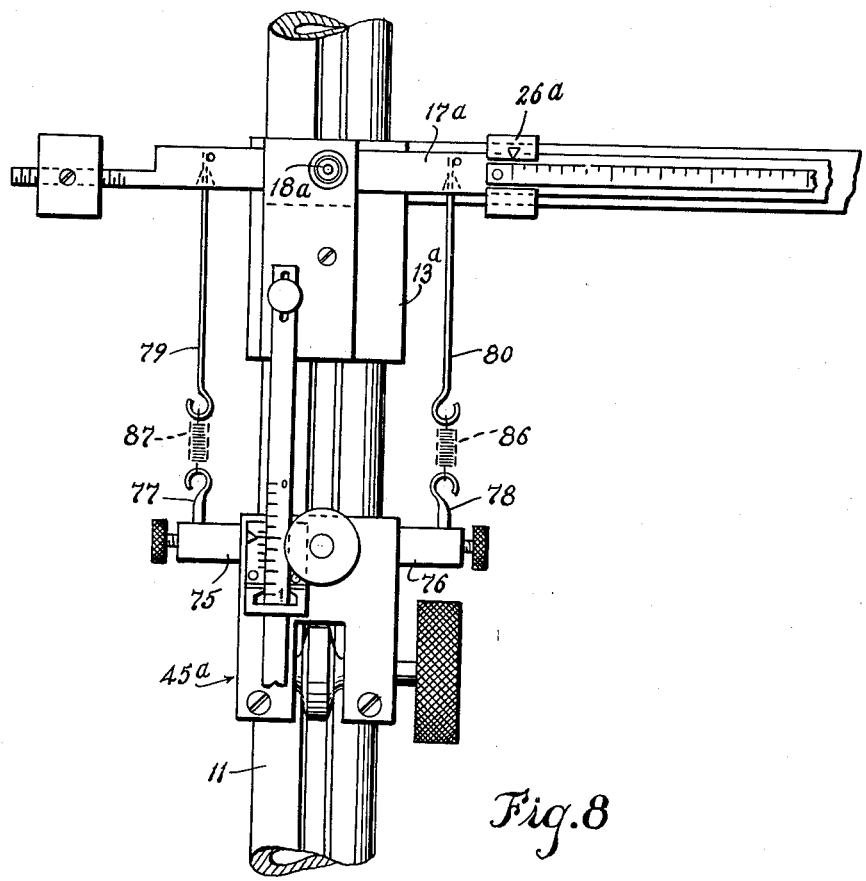
FIG. 8 is a front view of the tester modified to form a spring comparer.
Figure 9:
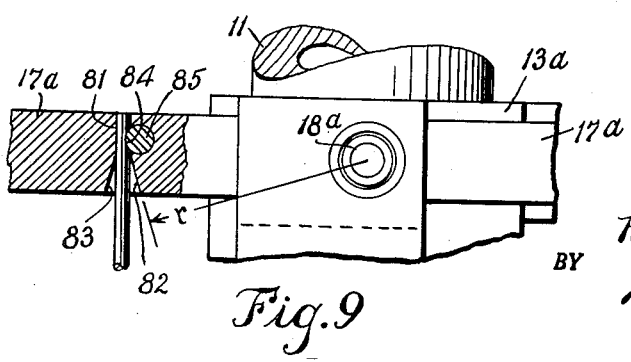
FIG. 9 is an enlarged fragmentary view of a portion of the comparer.

FIGS. 8 and 9 illustrate a modified form of the invention arranged to compare a tension spring of unknown characteristics with a similar spring of known characteristics. Here, a block 13a, similar to block 13 of FIG. 1, is secured on the standard 11 and has rotatably mounted thereon, at 18a, a beam 17a, similar to beam 17. A carriage 45a, similar to carriage 45 is adjustable along the standard 11 and carries two oppositely projecting blocks 75 and 76 to which are attached hooks 77 and 78, respectively.

Flexible wire hooks 79 and 80 are attached to the beam 17a on opposite sides of the block 13a. The manner of attachment of these hooks to the beam is illustrated in FIG. 9. Each hook extends into a hole 81 in the beam 17a. Such hole is cylindrical throughout the upper portion thereof, but flares outwardly throughout its lower portion, the surfaces 82 thereof following a radius $r$ whose center is located at the center of bearing 18a. The opposite surface 83 also follows a radius 83 which follows a similar radius whose center is located in a plane extending longitudinally of the beam 17a and passing through the center of bearing 18a.

The hook is notched at 84 and is held in place by a pin 85 extending through the beam 17a and through the notch 84.

In order to check an unknown tension spring, i.e. 86 against a similar spring 87 whose characteristics are known, the slider weight 26a is adjusted until the beam 17a is in free balance. The spring 86 is mounted between hooks 78 and 80 and the spring 87 is mounted between hooks 77 and 79. The carriage 45a may be adjusted for any desired deflection of the springs and the condition of the beam noted to obtain a comparison of the spring 86 with spring 87. Whenever the beam 17a is rocked from its normal horizontal position the flexible wire hooks 79 will wrap around the arcuate edges, i.e. 82 and 83, of the lower portions of the holes in which they are mounted, thereby insuring that the axes of hooks 79 and 80 are maintained parallel to the axis of the standard 11 to eliminate any spurious deflection of the beam 17a due to the hooks 79 and 80.

Having thus described my invention, what I desire to secure by United States Letters Patent is:

1. A spring testing device comprising a standard, said standard having a groove extending therealong, said groove having diverging sides, a bracket on said standard, a scale beam pivotally supported by said bracket, a spring carriage movable along said standard, said beam and said carriage having means for supporting a spring therebetween, a friction wheel rotatably mounted on said carriage, said wheel having converging sides engageable with said diverging groove sides, means on said carriage frictionally engaging said wheel in said groove, and means for manually rotating said wheel in either direction.

2. A spring testing device comprising a standard, said standard having a groove extending therealong, said groove having diverging sides, a bracket on said standard, a scale beam pivotally supported by said bracket, a spring carriage movable along said standard on one side of said bracket, said beam and said carriage having means for supporting a spring therebetween, a friction wheel rotatably mounted on said carriage, said wheel having converging sides engageable with said diverging groove sides, means on said carriage frictionally engaging said wheel in said groove, means for rotating said wheel in either direction, a second spring carriage movable along said standard on the opposite side of said bracket, said beam and said second carriage having means for supporting a spring therebetween, a second friction wheel rotatably mounted on said second carriage, said second wheel having converging sides engageable with said diverging groove sides, means on said second carriage frictionally engaging said second wheel in said groove, and means for rotating said second wheel in either direction.

3. A spring testing device comprising a standard, said standard having a groove extending therealong, said groove having diverging sides, a bracket movable along said standard, means engageable with the sides of said groove for adjustably securing said bracket in different positions along said standard, a bracket on said standard, a scale beam pivotally supported by said bracket, a spring carriage movable along said standard on one side of said bracket, said beam and said carriage having means for supporting a spring therebetween, a friction wheel rotatably mounted on said carriage, said wheel having converging sides engageable with said diverging groove sides, means on said carriage frictionally engaging said wheel in said groove, means for rotating said wheel in either direction, a second spring carriage movable along said standard on the opposite side of said bracket, said beam and said second carriage having means for supporting a spring therebetween, a second friction wheel rotatably mounted on said second carriage, said second wheel having converging sides engageable with said diverging groove sides, means on said second carriage frictionally engaging said second wheel in said groove, and means for rotating said second wheel in either direction.

4. A spring testing device comprising a standard, said standard having a groove extending therealong, said groove having diverging sides, a bracket on said standard, a scale beam pivotally supported by said bracket, a spring carriage movable along said standard, said beam and said carriage having means for supporting a spring therebetween, said carriage having a portion yieldable toward and away from said standard, a friction wheel rotatably mounted on said carriage portion, said wheel having converging sides engageable with said diverging groove sides, means for manually rotating said wheel in either direction, and means for moving said carriage portion toward said standard whereby to frictionally engage said wheel in said groove.

5. A spring testing device comprising a standard, a bracket on said standard, a scale beam pivotally supported by said bracket, means on said standard for supporting one end of a spring to be tested, an elongated flexible member for supporting at one end thereof the opposite end of said spring, said beam having an opening therein, and means securing the opposite end of said member in said opening, said opening having an arcuate surface extending along a radius whose center is coincident with the pivotal center of said beam.

6. A spring testing device comprising a standard, a bracket on said standard, a scale beam pivotally supported by said bracket, means on said standard for supporting one end of a spring to be tested, an elongated flexible member for supporting at one end thereof the opposite end of said spring, said beam having an opening therein, and means securing the opposite end of said member in said opening, said opening having an arcuate surface extending along a radius whose center is coincident with the pivotal center of said beam, said opening having a second arcuate surface opposite said first mentioned surface, said second surface extending along a radius equal in length to said first mentioned radius.

References Cited in the file of this patent

UNITED STATES PATENTS 2,612,041     Goodfriend _____ Sept. 30, 1952

FOREIGN PATENTS 146,474     Australia _____ May 13, 1952

OTHER REFERENCES

"Elasticometer Type RS2 Spring Tester," Published in the American Machinists, pages 919–920, June 11, 1931.

"Baldwin Hunter Spring Tester" (Baldwin), published by Baldwin (Philadelphia), 1949, pages 1–4 relied on.